(12) United States Patent  
Komoto

(10) Patent No.: US 8,929,956 B2
(45) Date of Patent: Jan. 6, 2015

(54) DATA COMMUNICATION TERMINAL, INFORMATION STORAGE MEDIUM AND DATA PROCESSING METHOD THEREFOR

(75) Inventor: Takahito Komoto, Kanagawa (JP)

(73) Assignee: NEC Casio Mobile Communications, Ltd., Kanagawa (JP)

(*) Notice: Subject to any disclaimer, the term of this patent is extended or adjusted under 35 U.S.C. 154(b) by 1 day.

(21) Appl. No.: 13/810,827

(22) PCT Filed: Sep. 7, 2011

(86) PCT No.: PCT/JP2011/005018
§ 371 (c)(1),
(2), (4) Date: Jan. 17, 2013

(87) PCT Pub. No.: WO2012/042756
PCT Pub. Date: Apr. 5, 2012

(65) Prior Publication Data
US 2013/0178249 A1    Jul. 11, 2013

(30) Foreign Application Priority Data

Sep. 28, 2010 (JP) ................................ 2010-216426

(51) Int. Cl.
*H04M 1/00* (2006.01)
*H04W 68/00* (2009.01)
*H04M 1/725* (2006.01)
*H04M 1/57* (2006.01)

(52) U.S. Cl.
CPC ........ *H04W 68/005* (2013.01); *H04M 1/72552* (2013.01); *H04M 1/575* (2013.01); *H04M 1/72519* (2013.01); *H04M 2250/60* (2013.01)
USPC ........................... 455/566; 455/567; 455/415

(58) Field of Classification Search
CPC ..... H04W 68/00; H04W 68/005; H04W 4/16; H04W 4/18; H04M 1/274508; H04M 1/274533
USPC ......................................... 455/566, 567, 415
See application file for complete search history.

(56) References Cited

U.S. PATENT DOCUMENTS

| 2006/0085505 A1* | 4/2006 | Gillum et al. ................. 709/206 |
| 2007/0123193 A1 | 5/2007 | Kitada |
| 2008/0162649 A1* | 7/2008 | Lee et al. ...................... 709/206 |
| 2014/0045552 A1* | 2/2014 | Cho et al. ...................... 455/566 |

FOREIGN PATENT DOCUMENTS

| JP | 08-032690 | 2/1996 |
| JP | 11-112618 | 4/1999 |
| JP | 2000-124987 | 4/2000 |
| JP | 2001-075891 | 3/2001 |
| JP | 2002-152323 | 5/2002 |
| JP | 2003-333137 | 11/2003 |
| JP | 2007-129506 | 5/2007 |
| JP | 2007-143057 | 6/2007 |

OTHER PUBLICATIONS

International Search Report, PCT/JP2011/005018, Dec. 13, 2011.

* cited by examiner

*Primary Examiner* — Temica M Beamer
(74) *Attorney, Agent, or Firm* — Young & Thompson

(57) ABSTRACT

A contact receiving unit (110) receives a contact request from another person. An incoming get-through unit (120) allows the received contact request to get through. Note, however, that when the contact request has not got through, if a sender of the contact request is not registered in a communicator registering unit (140), then an incoming presenting unit (130) presents the contact request that has not got through, by a predetermined display image. On the other hand, if a communicator of the contact request that has not got through is registered in the communicator registering unit (140), then a specific presentation unit (150) presents the contact request that has not got through, by a specific display image.

8 Claims, 5 Drawing Sheets

DATA COMMUNICATION TERMINAL, INFORMATION STORAGE MEDIUM AND DATA PROCESSING METHOD THEREFOR

TECHNICAL FIELD

The present invention relates to a data communication terminal that receives a contact request from another person and allows the contact request to get through. More particularly, the present invention relates to a data communication terminal that presents contact that has not got through, by a predetermined display image, and a computer program and a data processing method for the data communication terminal.

BACKGROUND ART

In a conventional mobile phone, when the user cannot answer when making a sound to notify of an incoming call or an incoming email or when the user does not notice that there has been an incoming call or an incoming email, in general, display of a missed call or an incoming email indicating that there has been an incoming call or email is performed on a display unit of the mobile phone.

It is common that the display is provided as a notification icon indicating a missed call or an incoming email on a standby screen. When the notification icon is selected, the screen transitions to a missed call record screen or an email list screen.

Currently, there are various propositions of a data communication terminal such as that described above (Patent Documents 1 to 4).

RELATED DOCUMENT

Patent Document

Patent Document 1: JP 2000-124987 A
Patent Document 2: JP 2002-152323 A
Patent Document 3: JP 2003-333137 A
Patent Document 4: JP 08-032690 A

SUMMARY OF THE INVENTION

Technical Problem

However, in the conventional mobile phones, a screen to be transitioned to is the same regardless of whether there is one or a plurality of missed calls or incoming emails to be notified. Thus, even if there is a missed call or an incoming email that the user wants to check on a priority basis, the user needs to operate the mobile phone until finding corresponding received information and then check it. Hence, there is a problem that the user cannot promptly check a missed call or an incoming email that he/she wants to check.

The present invention is made in view of a problem such as that described above. An object of the present invention is therefore to provide a data communication terminal that allows a user to recognize at a glance a call request or an email received from a specific communicator, and a computer program and a data processing method for the data communication terminal.

Solution to Problem

A data communication terminal of the present invention includes: a contact receiving unit which receives a contact request from another person; an incoming get-through unit which allows the received contact request to get through; an incoming presenting unit which presents a contact request that has not got through, by a predetermined display image; a communicator registering unit which registers a specific communicator; and a specific presentation unit which presents, by a specific display image, a contact request that is from the registered communicator and that has not got through.

A computer program of the present invention is a computer program for a data communication terminal of the present invention, and causes the data communication terminal to perform: a contact reception process of receiving a contact request from another person; an incoming get-through process of allowing the received contact request to get through; an incoming presentation process of presenting a contact request that has not got through, by a predetermined display image; a communicator registration process of registering a specific communicator; and a specific presentation process of presenting, by a specific display image, a contact request that is from the registered communicator and that has not got through.

A data processing method of the present invention is a data processing method for a data communication terminal of the present invention, and causes the data communication terminal to perform: a contact reception operation of receiving a contact request from another person; an incoming get-through operation of allowing the received contact request to get through; an incoming presentation operation of presenting a contact request that has not got through, by a predetermined display image; a communicator registration operation of registering a specific communicator; and a specific presentation operation of presenting, by a specific display image, a contact request that is from the registered communicator and that has not got through.

The "reception of a contact request" corresponds, for example, to reception of a telephone call request or reception of a sent email. The "get-through of a contact request" corresponds, for example, to that the phone goes into a talk state as a result of a receiver having received a call request performing an operation to accept an incoming call, or the body of an incoming email goes into a state of being displayed on a display as a result of a receiver of the email performing an operation to open the email. The "contact request that has not got through" corresponds, for example, to a call request that has not gone into a talk state because a receiver of the call request has not performed an operation to accept an incoming call, or an incoming email on which an operation to open the incoming email has not been performed yet by a receiver of the email, leaving the email in a so-called unopened state. The "presentation of a contact request that has not got through, by a predetermined display image" corresponds to a process performed to notify a user of the presence of a contact request that has not got through, for example, a process of displaying a predetermined icon on a so-called standby screen. Note that when notifying the user of the presence of a contact request that is from a communicator different than a "registered specific communicator" and that has not got through, a "predetermined display image (for example, an icon)" is used. The "registration of a specific communicator" corresponds, for example, to registration of the phone number and email address of the specific communicator. The "specific display image" is, for example, a display image (for example, an icon) used when notifying the user of the presence of a contact request that is from a registered communicator and that has not got through, and is distinguishable from at least the predetermined display image. A means for making the images distinguishable is not particularly limited; for example, the pictures of icons themselves may be different from each other, or the same picture may be used for icons but their display techniques (blinking display, enlarged display, etc.) may be different from each other.

Note that various components of the present invention may be formed in any way as long as their functions can be implemented; for example, they can be implemented by dedicated hardware that provides predetermined functions, a data communication terminal having predetermined functions provided by a computer program, predetermined functions implemented on a data communication terminal by a computer program, and any combination thereof.

In addition, various components of the present invention are not necessarily need to be individually, independently present; for example, a plurality of components may be formed as a single member, a single component may be formed of a plurality of members, a given component may be a part of another component, or a part of a given component and a part of another component may overlap.

In addition, although in the computer program and data processing method of the present invention, a plurality of processes and operations are described in order, the described order does not limit the order in which the plurality of processes and the plurality of operations are performed.

Therefore, when the computer program and data processing method of the present invention are performed, the order of the plurality of processes and the plurality of operations may be changed as long as the change does not affect the content.

Furthermore, in the computer program and data processing method of the present invention, the plurality of processes and the plurality of operations are not limited to be performed at individually different timings. Therefore, for example, while performing a given process and operation, another process and operation may occur, or the timing at which a given process and operation are performed and the timing at which another process and operation are performed may overlap in part or in full.

Advantageous Effects of Invention

In the data communication terminal of the present invention, the contact receiving unit receives a contact request from another person, and the incoming get-through unit allows the received contact request to get through. Note, however, that when the contact request has not got through, if a sender of the contact request is not registered in the communicator registering unit, then the incoming presenting unit presents the contact request that has not got through, by a predetermined display image. On the other hand, if the sender of the contact request that has not got through is registered in the communicator registering unit, then the specific presentation unit presents, by a specific display image, the contact request that has not got through. Hence, a call request or an email received from a specific communicator can be recognized at a glance.

BRIEF DESCRIPTION OF THE DRAWINGS

The above-described object and other objects, features, and advantages will become more apparent from a preferred embodiment described below and the following accompanying drawings.

DESCRIPTION OF EMBODIMENTS

Figure 1:
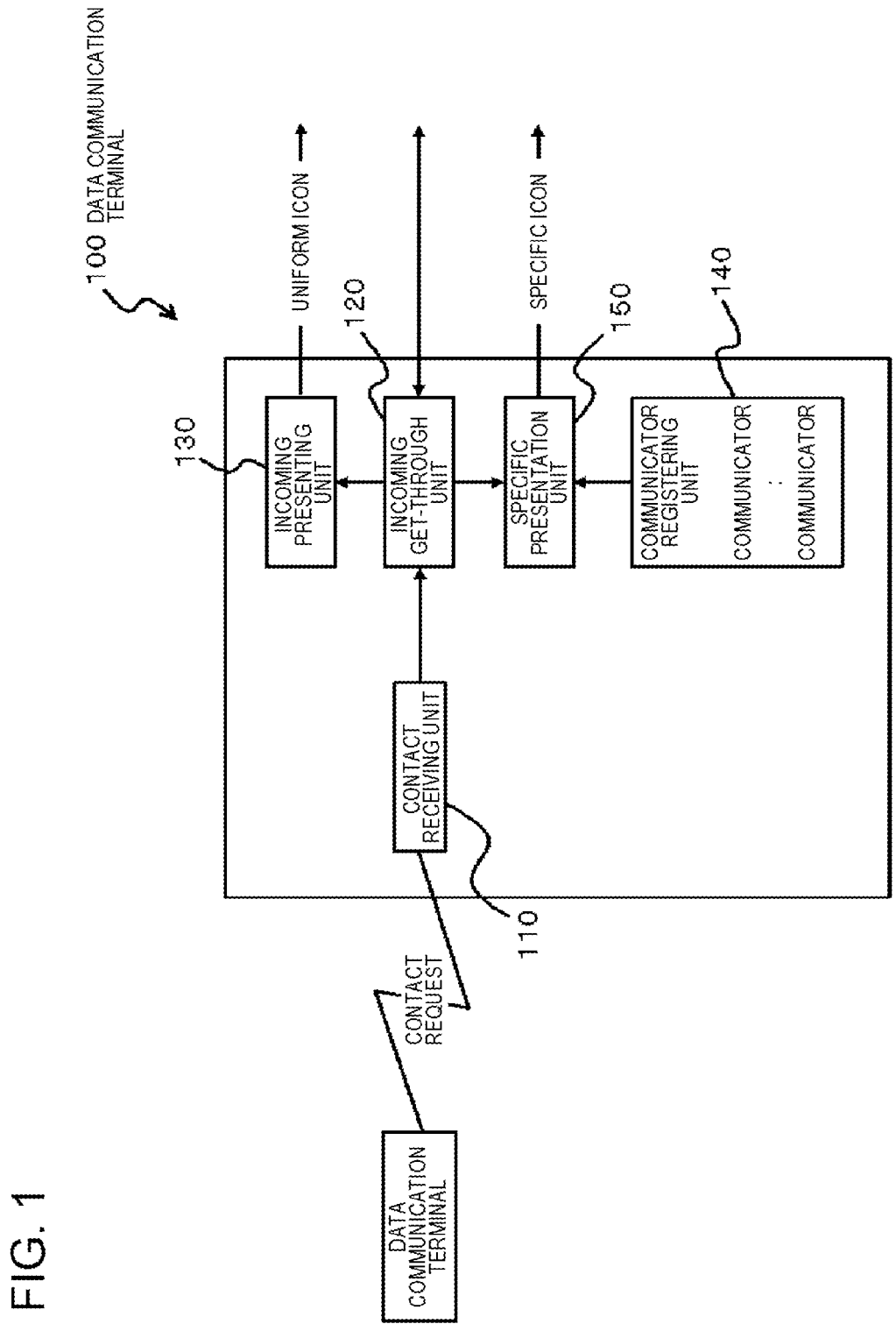
FIG. 1 is a schematic block diagram showing a logical structure of a data communication terminal of an embodiment of the present invention.

An embodiment of the present invention will be described below with reference to the drawings. A data communication terminal 100 of the present embodiment includes, as shown in FIG. 1, a contact receiving unit 110 which receives a contact request from another person; an incoming get-through unit 120 which allows the received contact request to get through; an incoming presenting unit 130 which presents a contact request that has not got through, by a predetermined display image; a communicator registering unit 140 which registers a specific communicator; and a specific presentation unit 150 which presents, by a specific display image, a contact request that is from the registered communicator and that has not got through.

Note that in order that the presence of a missed call and an incoming email from a specific communicator whom a user wants to check on a priority basis can be identified by notification icons on a standby screen, the communicator registering unit 140 can set and register the phone number, email address, missed call notification icon, and incoming email notification icon of the communicator, notification of which is given priority. The incoming presenting unit 130 displays a uniform icon as a display image. The specific presentation unit 150 displays a specific icon as a display image. The "uniform icon" is an icon for notifying the user of the presence of a contact request that is from an unregistered communicator and that has not got through. This icon is uniformly used for contact requests from unregistered users. The "specific icon" is an icon for notifying the user of the presence of a contact request that is from a registered specific communicator and that has not got through, and is distinguishable from at least the uniform icon. For example, the icon pictures of the uniform icon and the specific icon themselves may be different from each other. Alternatively, the pictures of the uniform icon and the specific icon themselves may be identical, but their display techniques (blinking display, enlarged display, etc.) may be different from each other. The uniform icon and the specific icon are displayed, for example, at a predetermined location of a so-called standby screen. Note that the specific icon may be such that different registered communicators can be identified by different specific icons, or when registered communicators are grouped and registered, different groups can be identified by different specific icons.

For example, the contact receiving unit 110 receives a call request from another person. The incoming get-through unit 120 allows the received call request to get through according to a user operation. If the call request has not got through, then according to the source of the call request, the incoming presenting unit 130 displays a uniform icon indicating a missed call, or the specific presentation unit 150 displays a specific icon indicating a missed call.

In addition, the contact receiving unit 110 receives an email from another person. The incoming get-through unit 120 allows the received email to get through according to a user operation. If the email has not got through (unopened) yet, then according to the source of the email, the incoming presenting unit 130 displays a uniform icon indicating an unopened email, or the specific presentation unit 150 displays a specific icon indicating an unopened email.

Note that the specific icon may be a single specific icon indicating registered specific communicators, or may be formed for each of a plurality of groups of specific communicators, or may be formed for each of a plurality of communicators.

The units 110 to 150 such as those described above are logically implemented by, for example, a microcomputer performing integrity control of hardware such as a data communication device and an image display device, according to a computer program.

Such a computer program is written to cause the data communication terminal 100 to perform, for example, a contact reception process of receiving a contact request from another person; an incoming get-through process of allowing the received contact request to get through; an incoming presentation process of presenting a contact request that has not got through, by a predetermined display image; a communicator registration process of registering a specific communicator; and a specific presentation process of presenting, by a specific display image, a contact request that is from the registered communicator and that has not got through.

In a configuration such as that described above, in the data communication terminal 100 of the present embodiment, the contact receiving unit 110 receives a contact request such as an email or a call request from another person. The incoming get-through unit 120 allows the received contact request to get through. By the contact request getting through, for example, the email is opened and is visually recognized by the user, or the user can talk to the communicator.

Note that when the contact request has not got through, a uniform icon which is a predetermined display image is displayed. The uniform icon is to display a missed call or an incoming email. In the case of a plurality of uniform icons, they are displayed in order of reception.

On the other hand, when the contact request that has not got through is from a registered communicator, a specific icon which is a specific display image is displayed. The specific icon is to display that a missed call or an incoming email is from a specific communicator. When a specific icon is displayed together with a plurality of uniform icons, for example, the specific icon is highlighted such as blinking or red color, or is displayed on the top regardless of the order of reception.

[Configuration of an Example]

Figure 2:
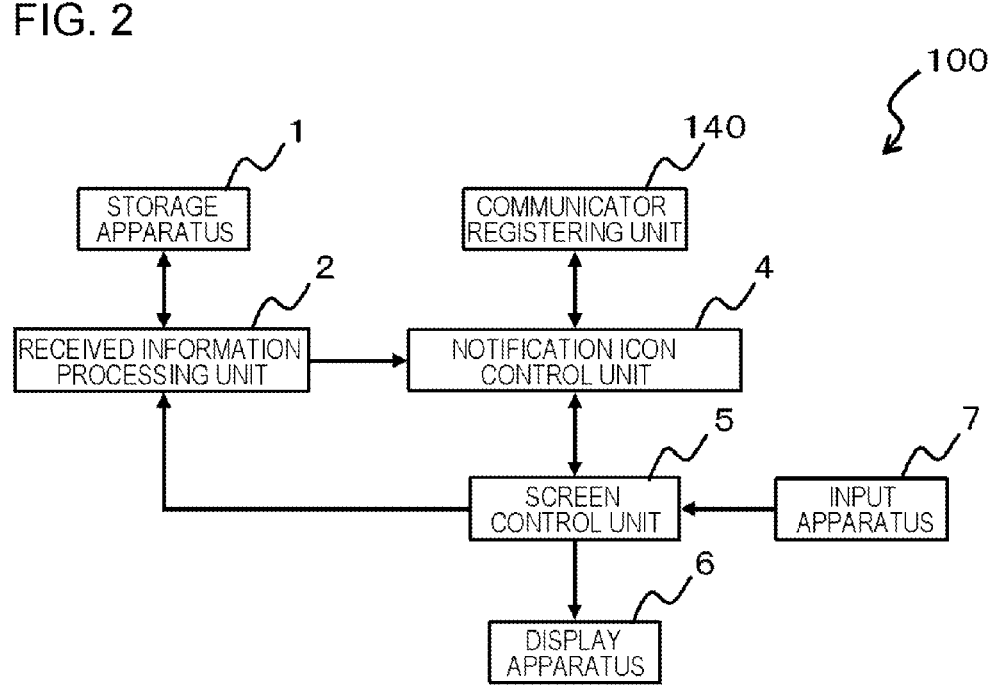
FIG. 2 is a block diagram showing a physical structure of a data communication terminal of an example of the present invention.

A data communication terminal 100 of the present example includes, as shown in FIG. 2, a storage apparatus 1 which holds missed call records and incoming emails; a received information processing unit 2 which identifies whether there are missed call records or incoming emails that have not been checked by a user, from the storage apparatus 1; a notification icon control unit 4 which changes a notification icon depending on the case in which the unchecked missed call records or incoming emails outputted from the received information processing unit 2 include a missed call record and an incoming email from a specific communicator set in advance by a communicator registering unit 140, or the case in which the above-described condition does not meet; a screen control unit 5 which controls a screen transition to a missed call record screen or an email content display screen, depending on the state of the notification icon outputted from the notification icon control unit 4 and the number of pieces of received information; a display apparatus 6 which displays the screen outputted from the screen control unit 5; and an input apparatus 7 used to perform operations on the displayed screen.

The received information processing unit 2 holds the content and number of incoming call records and incoming emails that have not been checked by the user, from the storage apparatus 1 and outputs received information to the notification icon control unit 4. In order that the presence of a missed call and an incoming email from a specific communicator whom the user wants to check on a priority basis can be identified by notification icons on a standby screen, the communicator registering unit 140 can set and register the phone number, email address, missed call notification icon, and incoming email notification icon of the communicator, notification of which is given priority. The screen control unit 5 changes the screen according to outputs from the notification icon control unit 4 and the input apparatus 7, and outputs the screen to the display apparatus 6.

[Operation in the Example]

In the data communication terminal 100 of the present embodiment, screens and icons used in the description of operation in the following example are defined as a "standby screen" which displays notification icons indicating received information, a "missed call record screen" which displays a list of unchecked missed call records, an "email details screen" which displays the details of any email content, an "email list screen" which displays a list of incoming email, and a "notification icon".

Figure 3:
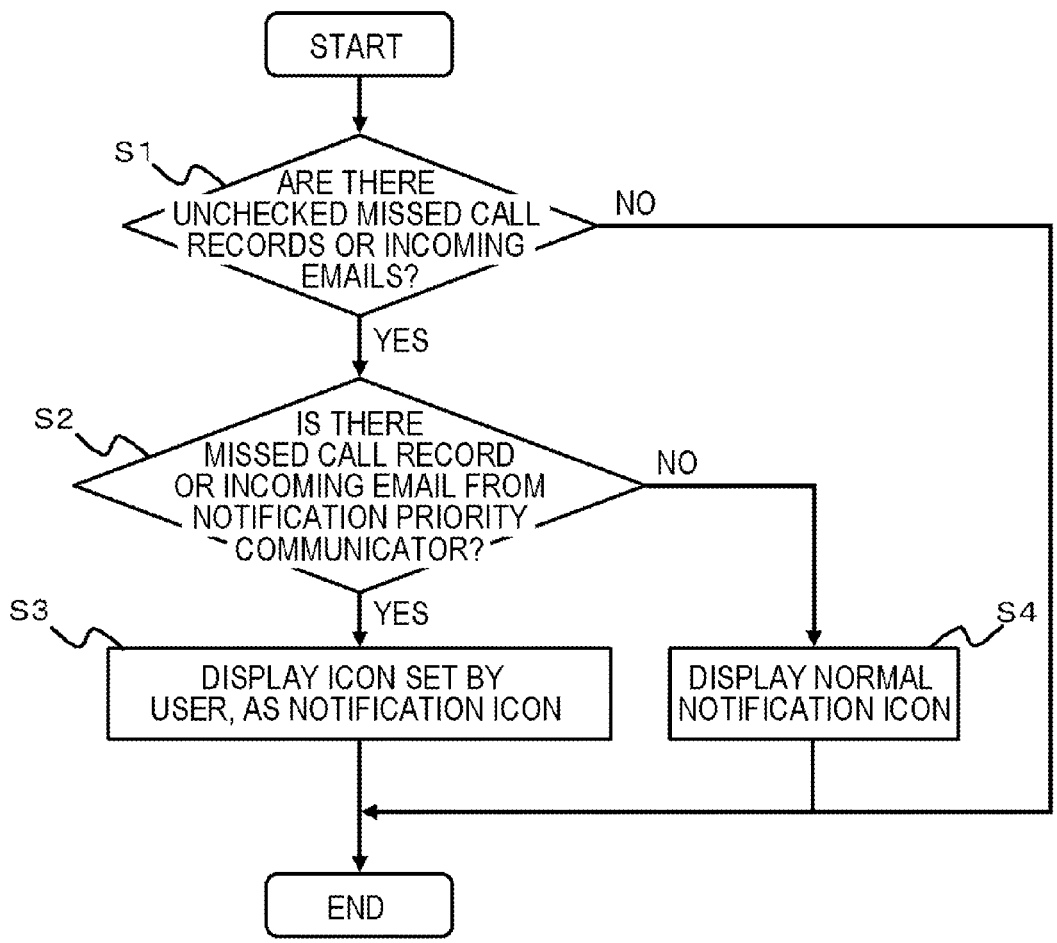
FIG. 3 is a flowchart showing a data processing method performed by the data communication terminal.

As shown in FIG. 3, when a standby screen is displayed, to change the screen, the screen control unit 5 checks the received information processing unit 2 whether there is notification of missed call records or incoming emails (step S1).

The received information processing unit 2 outputs missed calls and incoming emails that have not been checked by the user and the numbers thereof to the notification icon control unit 4 from the storage apparatus 1. The notification icon control unit 4 checks whether the received information does not include information set by the communicator registering unit 140 (step S2). If not included, then the notification icon control unit 4 outputs a uniform icon (step S3). If included, then the notification icon control unit 4 outputs a specific icon to the screen control unit 5 (step S4). The screen control unit 5 outputs a standby screen including notification icons notifying of a missed call record and an incoming email, to the display apparatus 6 for display.

Figure 4:
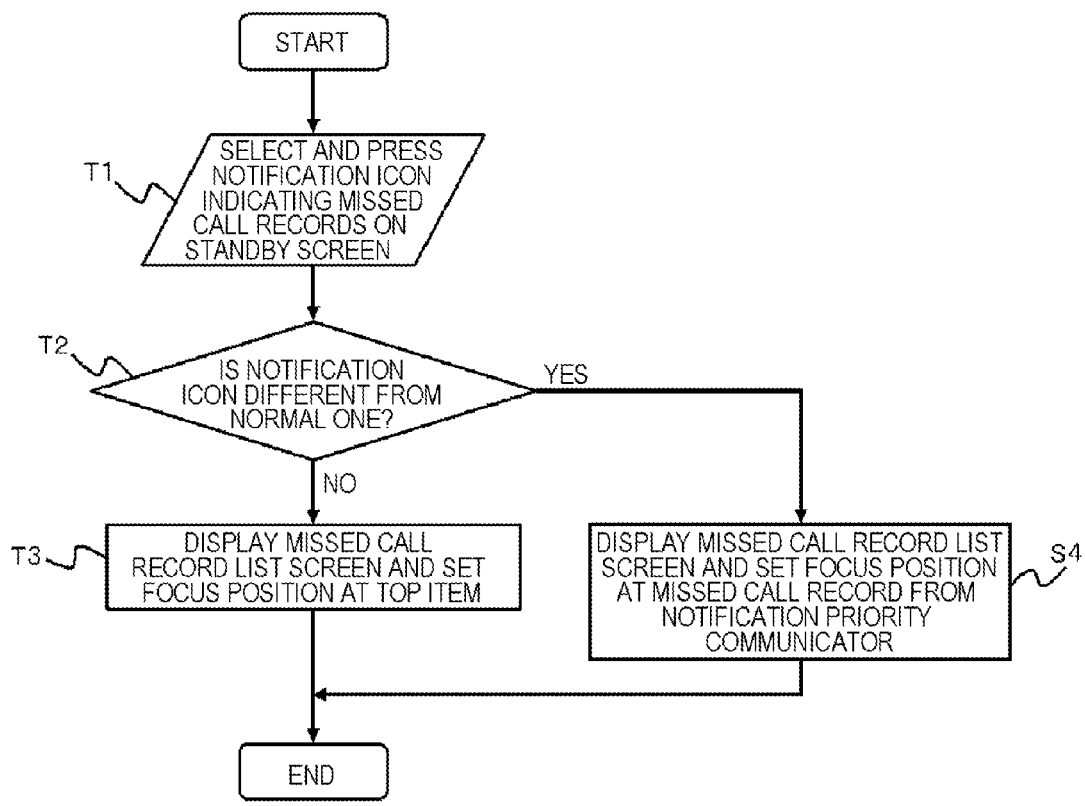
FIG. 4 is a flowchart showing a data processing method performed by the data communication terminal.

As shown in FIG. 4, when a notification icon informing about unchecked missed call records is selected and pressed by the input apparatus 7 such as a key during display of the standby screen (step T1), the screen control unit 5 checks the notification icon control unit 4 whether the icon is different from a uniform icon, in order to determine whether there is a missed call record and an incoming email from a notification priority communicator (step T2).

If the icon is a uniform icon, then on a "missed call record screen", a screen where a focus position is set at the top item is displayed (step T3). For example, incoming call records are arranged in order of arrival, and a predetermined number (design matters) of incoming call records, starting from the latest incoming call record are displayed on the screen in list form. On the other hand, if the icon is a specific icon in the communicator registering unit 140, then on a "missed call record screen", a screen where a focus position is set at a missed call record from a notification priority communicator is displayed (step T4). For example, incoming call records are arranged in order of arrival, and a predetermined number of incoming call records are displayed on the screen in list form such that a missed call record from a notification priority communicator is located in a predetermined position (on the top, in the middle, etc.) in the display of the list displayed on the screen.

Figure 5:
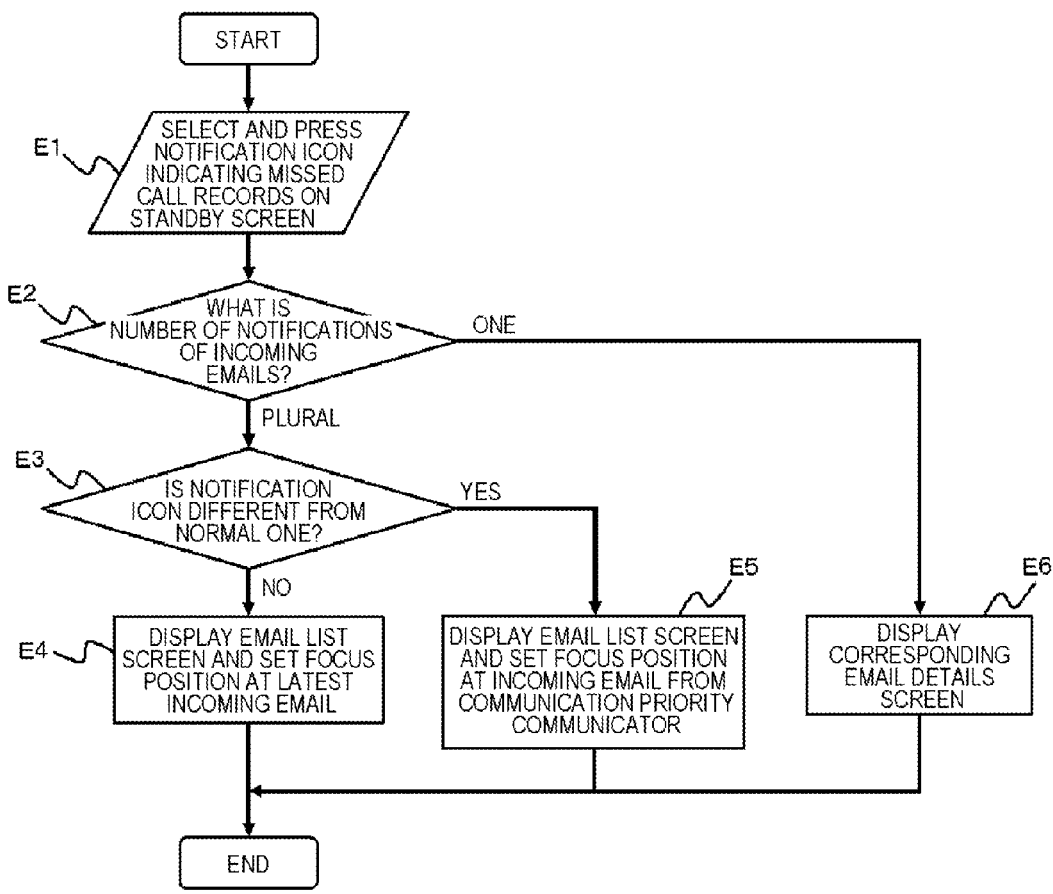
FIG. 5 is a flowchart showing a data processing method performed by the data communication terminal.

Alternatively, as shown in FIG. 5, when a notification icon informing about unchecked incoming emails is selected and pressed by the input apparatus 7 such as a key during display of the standby screen (step E1), the screen control unit 5 checks the notification icon control unit 4 about the number of notifications of incoming emails (step E2). If the number of notifications is one, then an "email details screen" for the corresponding email is displayed (step E6).

If the number of notifications is plural, then in order to determine whether there is an incoming email from a notification priority communicator, the notification icon control unit 4 checks whether the icon is different from a uniform icon (step E3). If the icon is a uniform icon, then on an "email list screen", a screen where a focus position is set at the latest incoming email is displayed (step E4). For example, incoming emails are arranged in order of reception, and a predetermined number (design matters) of incoming emails, starting from the latest incoming email are displayed on the screen in list form. On the other hand, if the icon is a specific icon, then on an "email list screen", a screen where a focus position is set at an incoming email from a notification priority communicator is displayed (step E5). For example, incoming emails are arranged in order of reception, and a predetermined number of incoming emails are displayed on the screen in list form such that an incoming email from a notification priority communicator is located in a predetermined position (on the top, in the middle, etc.) in the display of the list displayed on the screen.

The data communication terminal 100 of the present embodiment presents, as described above, contact requests that have not got through, by predetermined display images. When a contact request that has not got through is a contact request from a specific communicator registered in the communicator registering unit 140, a specific display image is presented. By viewing such a specific display image, the user can recognize at a glance a call request or an email received from the specific communicator and thus can promptly perform a reply, etc.

Note that the present invention is not limited to the embodiment and various modifications may be made without departing from the spirit and scope of the present invention. For example, the above-described embodiment illustrates that the units of the data communication terminal 100 are logically implemented as various functions by a computer program. However, each of such units can also be formed as unique hardware and can also be implemented as a combination of software and hardware.

Note also that in the above-described embodiment a mobile phone that performs calls and email communication is assumed as the data communication terminal 100. However, it is also possible to use a mobile phone that performs only calls, a PDA (Personal Digital Assistance) that performs only email communication, and the like.

This application claims priority to Japanese Patent Application No. 2010-216426 filed Sep. 28, 2010, the entire disclosure of which is incorporated herein by reference.

The invention claimed is:

1. A data communication terminal comprising:
a contact receiving unit which receives a contact request from a communicator;
an incoming get-through unit which allows the received contact request to get through;
a presentation unit that, when the contact request does not get through, displays on a standby screen an icon indicating that the contact request did not get through; and
a communicator registering unit which registers a specific communicator;
wherein the presentation unit includes,
an incoming presenting unit that, when the communicator of the contact request that did not get through is not registered in the communicator registering unit, displays on the standby screen a predetermined icon, and
a specific presentation unit that, when the communicator of the contact request that did not get through is registered in the communicator registering unit, displays on the standby screen an icon different from the predetermined icon or displays on the standby screen the predetermined icon using a display method different from that of the incoming presenting unit.

2. The data communication terminal according to claim 1, wherein reception of the contact request is reception of a telephone call request or reception of an email, and
get-through of the contact request is a telephone going into a talk state or the email being opened.

3. The data communication terminal according to claim 1, wherein when plural ones of the contact request did not get through,
the incoming presenting unit displays the predetermined icon on the standby screen when none of the communicators of the plural ones of the contact request that did not get through are registered in the communicator registering unit, and
the specific presentation unit displays an icon different from the predetermined icon on the standby screen or displays the predetermined icon using a display method different from that of the incoming presenting unit when a communicator of at least one of the plural ones of the contact request that did not get through is registered in the communicator registering unit.

4. The data communication terminal according to claim 3, wherein reception of the contact request is reception of a telephone call, and get-through of the contact request is a telephone going into a talk state, and
the data communication terminal further comprises a display unit that, when plural ones of the contact request did not get through and when an operation for the predetermined icon or an icon different from the predetermined icon displayed by the specific presentation unit is received, displays a list of the plural ones of the contact request that did not get through, with a focus position at the contact request of the communicator registered in the communicator registering unit.

5. The data communication terminal according to claim 3, wherein reception of the contact request is reception of an email, and get-through of the contact request is the email being opened, and
the data communication terminal further comprises a display unit that, when a plurality of the contact requests did not get through and when an operation for the predetermined icon or an icon different from the predetermined icon displayed by the specific presentation unit is received, displays a list of incoming emails, with a focus position at the email of the communicator registered in the communicator registering unit.

6. The data communication terminal according to claim 3, wherein reception of the contact request is reception of a telephone call, and get-through of the contact request is a telephone going into a talk state, and when the contact request did not get through and a user has not checked the contact request that did not get through, the presentation unit displays on the standby screen an icon indicating that the contact request did not get through and the user has not checked the contact request that did not get through.

7. A computer carrying out a method comprising:
a contact receiving step of receiving a contact request from a communicator;
an incoming get-through step of allowing the received contact request to get through;
a presentation step of displaying on a standby screen, when the contact request did not get through, an icon indicating that the contact request did not get through; and
a communicator registering step of registering a specific communicator,
wherein the presentation step includes,
an incoming presenting step of displaying a predetermined icon on the standby screen when the communicator of the contact request that did not get through is not registered in the communicator registering unit; and
a specific presentation step of displaying on the standby screen, when the communicator of the contact request that did not get through is registered in the communicator registering unit, an icon different from the predetermined icon or the predetermined icon using a display method different from that of the incoming presenting step.

8. A storage apparatus storing a program causing a computer to function as:
a contact receiving unit that receives a contact request from a communicator;
an incoming get-through unit that allows the received contact request to get through;
a presentation unit that, when the contact request did not get through, displays on a standby screen an icon indicating that the contact request did not get through; and
a communicator registering unit that registers a specific communicator,
wherein the presentation unit is caused to function as:
an incoming presenting unit that, when the communicator of the contact request that did not get through is not registered in the communicator registering unit, displays on the standby screen a predetermined icon, and
a specific presentation unit that, when the communicator of the contact request that did not get through is registered in the communicator registering unit, displays on the standby screen an icon different from the predetermined icon or displays on the standby screen the predetermined icon using a display method different from that of the incoming presenting unit.

* * * * *